United States Patent [19]

Ewing

[11] Patent Number: 4,679,585
[45] Date of Patent: Jul. 14, 1987

[54] FLOWMETER-CONTROLLED VALVING

[75] Inventor: James H. Ewing, Brockton, Mass.

[73] Assignee: MKS Instruments, Inc., Andover, Mass.

[21] Appl. No.: 818,216

[22] Filed: Jan. 10, 1986

[51] Int. Cl.$^4$ .............................................. F16K 31/02
[52] U.S. Cl. .................................. 137/486; 137/487.5; 137/624.15
[58] Field of Search .................. 157/486, 487.5, 624.13, 157/624.15

[56] References Cited

U.S. PATENT DOCUMENTS

| | | | |
|---|---|---|---|
| 3,469,804 | 1/1983 | Bouvet | 137/624.15 X |
| 3,874,407 | 4/1975 | Griswald | 137/624.15 X |
| 4,325,347 | 4/1982 | Yamaguchi | 137/487.5 X |
| 4,436,110 | 3/1984 | Leewama | 137/487.5 |
| 4,476,893 | 10/1984 | Schwelin | 137/487.5 X |

Primary Examiner—Alan Cohan
Attorney, Agent, or Firm—James E. Mrose

[57] ABSTRACT

An electrically-actuated fluid-flow control valve employed to establish and maintain prescribed flow conditions with the aid of a fast-response flowmeter is caused to operate swiftly, accurately and reliably by way of unique electrical circuitry which selectively enhances responses to low-level signals and cooperatively induces electromechanical oscillations offsetting hysteresis of the valve armature suspension. In a preferred context of a system wherein a thermal flowmeter is used to actuate a solenoid valve and thereby cause actual flow conditions to agree with those prescribed by operator-controlled settings, normal sluggishness of responses to low-level electrical signals is overcome by circuitry which under appropriate circumstances automatically exercises logic to command that the valve be disproportionately energized to effect immediate strong action which will reliably and quickly bring about intended and accurate change in flow. Within the valve itself, where unavoidable hysteresis associated with the spring suspension for the armature would otherwise tend to interfere with precision of control, corrective mechanical armature oscillation is advantageously induced at a suitable fixed ripple frequency at the same time that a pulse-type excitation circuit delivers variable-duty-cycle control output to the valve.

11 Claims, 1 Drawing Figure

FLOWMETER-CONTROLLED VALVING

BACKGROUND OF THE INVENTION

The present invention relates to improvements in electrical actuation of fluid-control valves to enhance responses which tend to be adversely affected by low levels of signals and/or by hysteresis, and, in one particular aspect, to novel and improved arrangements and practices for accurate, efficient and high-speed regulation of fluid flow whereby a solenoid control valve which responds to flowmeter measurements and electrically-characterized settings is so energized that it will develop minute hysteresis-suppressing vibrations and is at critical times automatically over-excited deliberately to stimulate immediate and effective valving action under certain near-zero flow conditions.

There are numerous and varied process-control systems, and the like, in which flow of liquid or gaseous fluid must be sensed and regulated by valving which will establish and maintain a condition characterized in some setting made by an operator or an established program. Control of gases used in complex semiconductor-etching operations involves such sensing and valving, for example, and there the system demands can be especially rigorous because of close tolerances to be observed in fashioning very intricate high-cost product. Solenoid-type valves, in which spring-suspended armature valving members are axially drawn open from seated fully-closed valving positions to extents governed by electrical currents driven through their windings, can be relatively uncomplicated and yet highly-effective devices which tend to be favored for application in such systems. However, such valves can also be sluggish in reacting to low levels of exciting current, particularly when they are to be cracked open from full closure, and the attendant lags can have untoward consequences in situations where exceptional precision and speed of response may be crucial. Moreover, such valves are further prone to exhibit so-called "hysteresis", probably due largely to erratic changes in the mechanics of their spring suspensions, whereby their valving operations in response to excitations are not always exactly the same; as would be expected, the consequences in system performance can be unfavorable on that account as well.

SUMMARY OF THE INVENTION

In accordance with certain aspects of the present teachings, it is recognized that operation of fluid-control valves in response to flowmeter measurements and setpoint instruction signals can be improved significantly, and particularly in respect of precision and avoiding serious lag, by way of unique electrical circuitry which will automatically exercise certain logic and occasion switching to enhance valve functions when low excitations would otherwise develop inadequate power, and which will also exploit pulse techniques to energize the valve both efficiently and in such a manner as to intentionally bring about certain minute vibration. A system expressing those comcepts may include a thermal flowmeter and a solenoid valve in association with a gaseous-flow path, the flowmeter electrical outputs being referenced to setpoint electrical signals for purposes of establishing whether intended flow is being realized and whether the valve should be excited more or less to effect that specific flow. A relatively critical condition exists when the valve has been closed and a small flow change is to be made by cracking the valve open only slightly; accordingly, the lag which attends the normal low-power operation of the system control circuitry at such times is avoided via a logic-type evaluation of setpoint and flowmeter signals and via a related automatic switching of valve excitation so that it will be rather forcefully powered until values of input above a given threshhold are witnessed and will occasion such powering of their own accord. For the latter purposes, a network including an electronic switch in the form of a field-effect transistor (FET) is used to apply a full-scale or other relatively large input signal to the valve-control circuitry when the system has been set to regulate the flow up to some desired level and the actual flow is at or near zero and might be slow in reaching that level. The network determines when a signal representing the actual flow exceeds a low "threshhold" level and acts to cut off the switch input to the valve-control circuitry at such times thereby allowing the valve to respond in a conventional manner. The electronic switch is held off so long as it is sensed that flow is above the threshhold level. Under circumstances when a valve has already been opened adequately, so that its operation would not be expected to involve lags associated with having to be cracked open, valve excitations commanded by normal operation of the system should be adequate to bring about needed flow without resort to other measures, and the network takes that into account. As to such excitations of the valve, it can be important to avoid error-inducing responses due to "hysteresis" effects wrongly allowing the movable valving member to take up somewhat different valving positions at different times even though there are the same values of applied excitations. Accordingly, in exciting the valve in response to the aformentioned logic-sorted signalling, a pulse-generating controller is introduced to produce outputs in the form of fixed-rate trains of pulses whose duty cycle is varied to reflect the inputs. The selected rate is preferably in the low audio range and causes the control currents fed to the solenoid valve to have a related ripple which will in turn result in minute hum-like armature vibrations essentially eliminating the problem with hysteresis. Pulsing in this fashion is aided through use of a field-effect transistor (FET) which has essentially negligible power loss when on and thereby conserves system energy.

Accordingly, it is one of the objects of the present invention to provide for unique and advantageous control of electrically-operated fluid valving which will cause it to respond swiftly, reliably and accurately to even certain low-level signals and under difficult cracking-open conditions and without significant error due to hysteresis effects.

It is a further object to implement distinctive precise and high-speed flowmeter control of fluid valves by way of relatively uncomplicated electronic circuitry which automatically determines that special impetus be introduced to overcome tendencies toward sluggish responses and which pulses the valving to improve efficiency and create deliberate dithering.

BRIEF DESCRIPTION OF THE DRAWINGS

Although the aspects and features of this invention which are considered to be novel are expressed in the appended claims, further details as to preferred practices and as to further objects and features thereof may be most readily comprehended through reference to the following detailed description when taken in connection with the accompanying drawing, wherein:

DETAILED DESCRIPTION OF THE PREFERRED EMBODIMENT

Figure 1:
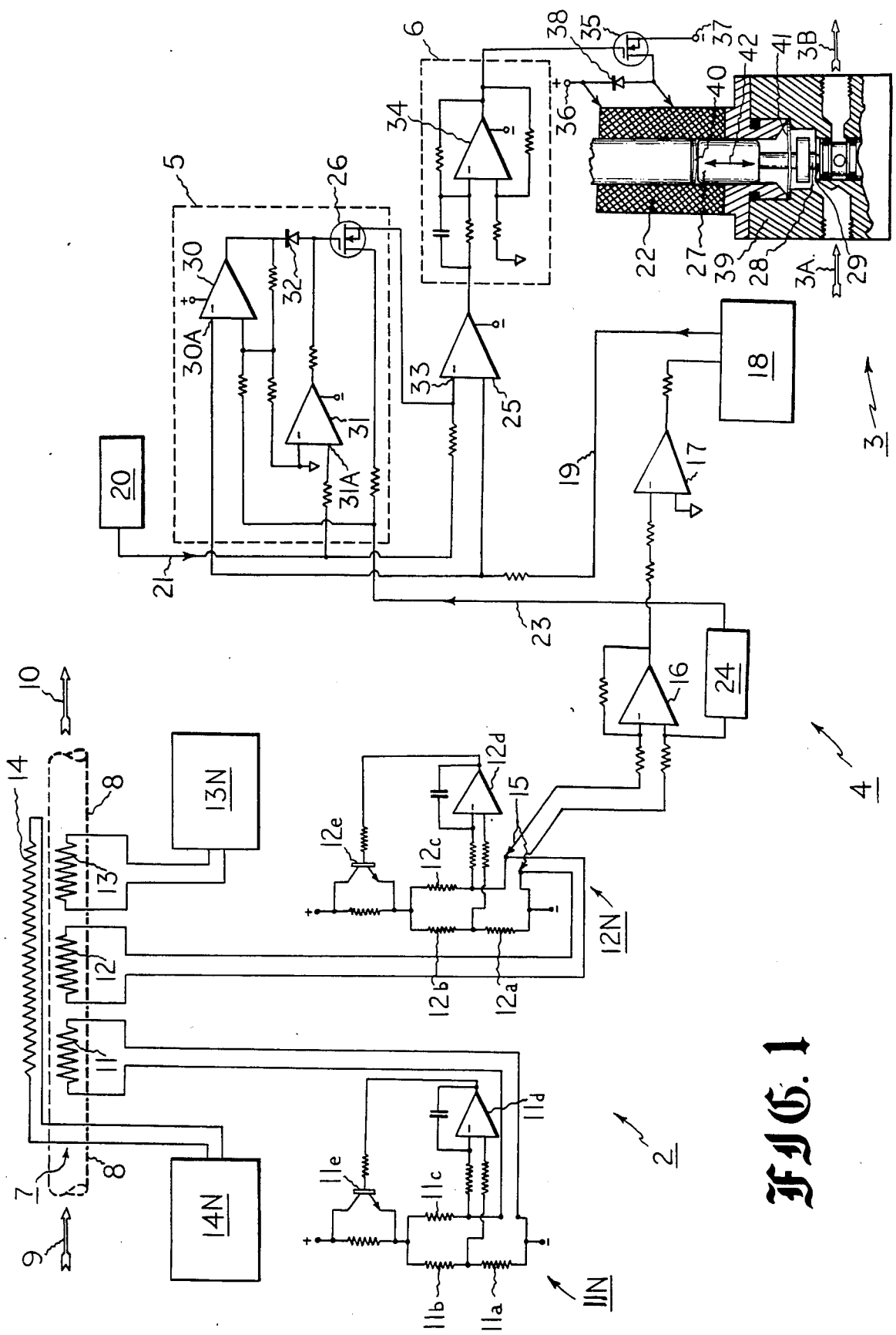
FIG. 1 is a partly schematic and partly block-diagrammed and partly cross-sectioned pictorial representation of an improved flowmeter-controlled fluid-valving system which expresses the present teachings.

Having reference to the drawing, an improved flow-control system is shown to include a swift-response thermal flowmeter 2 associated with a solenoid valve 3 and effecting regulation of its valving actions by way of electronic controller circuitry 4, the latter involving a cooperating "fast wake-up" network 5 and a variable-duty-cycle valve drive network 6, both blocked within dashed linework. The preferred flowmeter selected for illustration is of a type disclosed in my joint U.S. Pat. No. 4,464,932, wherein a measured stream of flow, such as that in the by-pass pathway 7 defined by dashed linework 8 and characterized by upstream arrow 9 and downstream arrow 10, interacts with resistive electrical heat-exchange elements 11, 12 and 13. Those elements are highly temperature-sensitive by virtue of their fabrication from high-temperature-coefficient wire, and their effects are distributed along the flow pathway to promote their successful interactions with the fluid even when flow rates are high. The upstream element 11 provides an initial conditioning of the oncoming fluid, and, under control of an automatically-rebalancing bridge network, 11N, of which it is a part, it adds such heating to the flowing fluid as will regulate its temperature at a first level which is in excess of any temperatures the fluid might be expected to have as it enters the flowmeter. Immediately thereafter, the midstream measurement element 12 adds heat to the flowing fluid under control of a second automatically-rebalancing bridge network, 12N, of which it in turn is a part. Energy involved in heating the fluid to a known extent, by the second element 12, from a known level regulated by the upstream element 11, can be interpreted as a measure of mass rate of flow, and that is done in association with circuitry of controller 4. A further regulation of temperature is effected by the downstream element 13, at a level preferably between the temperature levels for the upstream and midstream sections of the flowmeter, and, in that connection, a third automatically-rebalancing bridge network, 13N, generally like the other two, is involved in the measuring and heating operations for that third section. In addition, the assembly preferably includes an auxiliary fourth element 14, which regulates the ambient environmental temperature witnessed by all three principal elements 11-13; its control unit, 14N, is also generally like the others. In each of the automatically-rebalancing bridge networks, the respective elements each separately form one leg of a conventional type of full bridge, the other three legs, such as 11a–11c and 12a–12c of networks 11N and 12N, being made up of substantially constant resistances having relatively low temperature coefficients. Bridge outputs are sensed by operational amplifiers, such as 11d and 12d, which drive the networks' power booster transistors, 11e and 12e, to change currents forced through the resistive heater elements, 11 and 12, as needed to regulate fluid temperatures in the aforementioned ways.

The primary measurement winding element 12 develops voltage drops which are particularly significant from a flow-measurement standpoint, and therefore those voltages are tracked on a continuous basis, without affecting either the heating or temperature-sensing being performed by that element, by way of tapping 15 to an isolating high-impedance follower amplifier 16. Subsequent amplification is performed by amplifier 17, and its outputs of related flow-measurement information may be processed and/or conditioned in the electrical conditioner 18 which may provide a suitable display or record along with an output, on line 19, of signals "zeroed" or compensated for effects such as traces of unwanted output under what are actually no-flow conditions. The conditioned output is in turn employed to govern operation of the solenoid control valve 3 so that it will closely regulate the system flow of fluid to agree with what has been prescribed by an operator or by automatic means, and, for that purpose, appropriate electrical "setpoint" signals are also introduced, from an operator- or automatically-controlled source 20. Both of those signals, whose values represent measured actual flow on line 19 and some desired setting for the flow on the source line 21, are taken into account in determining to what extent, if any, the solenoid valve operating winding, 22, should be energized to adjust the system flow, characterized by valve input and output arrows 3A and 3B, respectively. However, although it might have been expected that those signals would always simply be compared and the amounts and senses of any differences relied upon to produce currents which would open or close the valve to greater or lesser extents, that is not adequate to resolve certain troublesome conditions which can arise when the valve must either be cracked open from closure or operated under near-zero flow conditions. At such times, the valve operation tends to be sluggish and afflicted with significant lag, and, in offsetting such difficulties, a unique so-called "fast wake-up" network, 5, is introduced. It performs certain logic evaluations, giving particular consideration to the flow-measurement signals which characterize whether the valve is shut or near closure, as evidenced by zero or near-zero flow, and it likewise takes note of the levels of prevailing settings or setpoints for the system. If a potentially troublesome zero or low-flow situation evidences itself at any time, network 5 instantaneously applies a suitably strong signal from the output line 23 of a reference electrical source 24 to an output-control amplifier 25 via the drain-source switching path of a field-effect transistor 26, and, in response, the solenoid winding 22 will be correspondingly strongly energized electrically and will powerfully draw its armature 27 upwardly and thereby forcefully raise its valving member 28 from its seat 29. Two amplifier sections, 30 and 31, are utilized in making the needed evaluations; one of these, 30, characterizes a line 19 input at 30A of signals representing actual measured flow, and the other, 31, characterizes a line 21 input at 31A of setpoint signals representing the desired flow. Outputs from those two sections are confronted via connections to oppositely-polarized electrodes of a diode 32; and the gate of FET 26 responds by switching the device on only when it witnesses a high-level signal prevailing on the side of output lead 31B of section 31. In their fast wake-up operation, the two diode-connected sections function to selectively turn on FET 26 when the measured-flow signal is not in excess of a small threshhold level, such as a predetermined level representing about 0.5% of a full-scale or maximum flow condition for the system, and when the setpoint signal is above that threshhold level. Those circumstances occasion need to jolt or strongly energize the valve either until the flow increases substantially or until the setpoint setting does not exceed the threshhold level. Specifically, whenever the input line 19 feeds the control amplifier 25 with signals evidencing a larger-than-threshhold level of measured flow, that amplifier will actuate valve 3 with a strong output, and no special assistance is required because there should not be intolerable sluggishness or lag in responses. However, when the valve is closed or near closure, and thus the actual flow being measured is zero or otherwise below the threshhold level, amplifier 25 should be artificially caused to deliver a strong output which will at least transiently force the valve to be driven more open forcefully and swiftly; FET 26, when switched closed, does that by applying a full-scale or other large level of actuating signal to amplifier input 33 from reference source 24. For the latter purposes, cooperating amplifier sections 30 and 31 evaluate or make logic assessments, with the aid of the diode 32 across which their respective outputs are applied. When their outputs are both high, then a corresponding high input from section 21 is delivered to the gate of FET 26, and it is switched on, coupling source 24 with input 33 of amplifier 25 and causing it to strongly energize control valve 3. However, if the output of either section 21 or 30 is low, the input to the gate of FET 26 must also be low and 26 is in a switched-off mode in which the valve is simply controlled in an expected way by the setpoint and measured-flow signals on lines 19 and 21. Amplifier section 31 outputs a high only when the setpoint input at 31A exceeds some preselected small threshhold level, such as one which is but 0.5% of a full-scale level for the system, but, conversely, amplifier section 30 outputs a high only when the measured-flow input signalling at its input 30A is not in excess of some preselected small threshhold level, preferably the same threshhold as that to which amplifier section 31 responds. That means that FET 26 will be switched on by the high level of signal at its gate when those conditions prevail. At other times, when measured flow is greater than the threshhold, output of section 30 drops, and diode 32 assures that no high level of signal can be maintained at the gate of switch 26, and that FET is in an off condition which leaves the control amplifier 25 to respond to the actual measured flow signals rather than an artificial full-scale high signal from source 24. The same is true when the setpoint signal on line 21 is below the threshhold level, because output of amplifier section 31 is then low and the FET gate can only witness a correspondingly low signal which maintains an off switching condition. Accordingly the artificially-derived stimulus to the valve is effective whenever needed because of zero or low flow. Advantageously, there is no false activation of the system by the logic network when new higher setpoints are introduced, and the desired boost or stimulus will automatically be triggered anew when the setpoint signal and flow signal fall below threshhold level.

In the powering of control valve 3, responsive to outputs from the aforementioned control amplifier 25, a variable-duty-cycle drive network is employed to develop certain pulsed, rather than steady-state or slowly-varying signals. That network, 6, includes a circuit 34 which is connected in a known fashion to operate in the manner of a free-running multivibrator, at a base pulse rate which is preferably in a low audio range of about 2,000 cycles, and in any event above about 100 cycles and below 40,000 cycles. Its square-wave duty cycle, or pulse width, is controlled by the output of amplifier 25, and the related squarewave pulse output from the network in turn is applied in control of a low-loss electronic switch, in the preferred form of a field-effect transistor, 35. As illustrated, the FET 35 has its gate excited by that pulse output and it is thereby caused to drive related pulses of current from source terminals 36 and 37 through solenoid winding 22 of the known type of control valve by way of its source-drain path; a catch diode 38 protects the FET in respect of its vulnerable association with the significant inductive load presented by the solenoid winding. The resulting average current witnessed by winding 22 determines to what extent the valve armature 27 will raise its valving member 28 from its seat 29 in the valve body 39, against the seating forces normally exerted by its two suspension springs, 40 and 41. Despite the inductive smoothing effects which are present, the solenoid winding current exhibits a ripple at the base repetition rate, such as 2 kc, and that ripple variation causes the valve armature 27 and attached valving member 28 to vibrate or dither beneficially in axial directions of dual-headed arrow 42. That slight vibration evidences itself as a hum, and its most distinctly advantageous effect is that of overcoming the aforementioned hysteresis, a condition which is largely influenced by unavoidable variations in characteristics of the spring suspension. In addition any other sticking tendencies are loosened as well. However, the armature should not be allowed to oscillate strongly, and the base pulse rate selected will therefore be one which does not produce oscillations overstressing the valve or otherwise degrading its critical valving performance. Importantly, the FET 35 involves insignificant power losses, and therefore there are virtually no heat-loss and dissipation problems.

Many of the devices, circuits and networks which have been described may be replaced by equivalents, it being noted that there are other known ways to express logic networks, generators of variable-duty-cycle pulses, amplifiers, electronic switches, flowmeters and electrically-operated valves. Accordingly, it should be understood that the specific embodiments and practices herein described and illustrated have been presented by way of disclosure rather than limitation, and that various modifications, combinations and substitutions may be effected by those skilled in the art without departure in spirit or scope from this invention in its broader aspects and as set forth in the appended claims.

What I claim as new and desire to secure by Letters Patent of the United States is:

1. Apparatus for controlling fluid flow, comprising a fluid-control valve having electrical winding means operable to regulate flow of fluid in a path by moving a valving member, means producing electrical flow signals characterizing actual amounts of fluid flow in said path, means producing electrical setpoint signals characterizing desired amounts of fluid flow in said path, controller means for energizing said winding means to regulate said fluid flow to agree with said desired amounts of said fluid flow responsive to electrical flow signals and setpoint signals appled thereto, a fast wake-up network having electrical switching means which may be turned on to apply to said controller means an artificial electrical setpoint signal which is larger than a predetermined relatively small threshhold setpoint signal and which will cause said controller means to energize said winding means strongly and thereby open said valve to commence or increase said fluid flow quickly, said network including means evaluating both said flow signals and said setpoint signals and turning on said switching means when said flow signals are smaller that a relatively small threshhold level and said setpoint signals are also in excess of said predetermined relatively small threshhold setpoint signal, and said controller means including means applying to said electrical winding means in control of said valving member electrical pulses having a predetermined relatively low-frequency repetition rate and having duty cycles which vary as required to move said valving member to regulate said flow of fluid, whereby rapid and free movement of said valving member are promoted by its being vibrated slightly at said rate and energized strongly by said fast wake-up network.

2. Apparatus for controlling fluid flow as set forth in claim 1 wherein said means producing said flow signals is a flowmeter, wherein said valve is a solenoid valve in which said valving member is movable from a normally-closed seated position toward which it is biased by springs associated with an armature, and wherein said low-frequency rate is fixed and in the range between about one hundred and about forty thousand cycles.

3. Apparatus for controlling fluid flow as set forth in claim 2 wherein said rate is of the order of about two thousand cycles, wherein said threshhold level of said flow signals is of the order of about one-half percent of the expected maximum or full-scale level of said flow signals, and wherein said threshhold setpoint signal is of the order of about one-half percent of the expected maximum or full-scale setpoint signals.

4. Apparatus for controlling fluid flow as set forth in claim 2 wherein said controller means includes a variable-duty-cycle multivibrator and an electronic switch operated by said multivibrator to connect said winding means with an electrical power source therefor in synchronism with and for durations of electrical pulses generated by said multivibrator.

5. Apparatus for controlling fluid flow as set forth in claim 4 wherein said electronic switch comprises a field-effect transistor having its gate excited by said pulses generated by said multivibrator, and wherin said means evaluating said flow signals and said setpoint signals includes a first electronic circuit which produces distinctively different outputs when said flow signals are lower and higher, respectively, than said threshhold level, a second electronic circuit which produces distinctively different outputs when said setpoint signals are higher and lower, respectively, than said threshhold, and means turning on said electrical switching means only when said distinctively different outputs from said first and second electronic circuits characterize simultaneous occurrences of the lower flow signals and the higher setpoint signals.

6. Apparatus for controlling fluid flow as set forth in claim 5 wherein said first and second electronic circuits include amplifiers producing said different outputs in the form of high and low voltage outputs, respectively, and further including a diode coupling the voltage outputs from said circuits and wherein said electrical switching means comprises a fiel-deffect transistor having its gate excited by the voltages appearing at one electrode of said diode and having its drain-source path connected to couple a reference voltage source with said controller means as said artificial electrical signal.

7. Apparatus for controlling fluid flow as set forth in claim 6 wherein said first electronic circuit produces high and low voltage outputs when said flow signals are lower and higher, respectively, wherein said second electronic circuit produces high and low voltage outputs when said setpoint signals are higher and lower, respectively, wherein the anode of said diode is connected to receive voltage outputs from said first electronic circuit and to excite said gate, and wherein said artificial electrical signal is of the order of about the full-scale value of said setpoint signals 8. Apparatus for controlling fluid flow, comprising a fluid-control valve having electrical winding means operable to regulate flow of fluid in a path by moving a valving member, means producing electrical flow signals characterizing actual amounts of fluid flow in said path, means producing electrical setpoint signals characterizing desired amounts of fluid flow in said path, controller means for energizing said winding means to regulate said fluid flow to agree with said desired amounts of said fluid flow responsive to said electrical flow signals and setpoint signals appled thereto, and a fast wake-up network having electrical switching means which may be turned on to apply to said controller means an artifical electrical setpoint signal which is larger than a predetermined relatively small threshold setpoint signal and which will cause said controller means to energize said winding means strongly and thereby open said valve to commence or increase said fluid flow quickly, said network including means evaluating both said flow signals and said setpoint signals and turning on said switching means when said flow signals are smaller than a relatively small threshhold level and said setpoint signals are also in excess of said predetermined relatively small threshhold setpoint signal, whereby rapid movement of said valving member at or near its zero-flow orientation is promoted by its having said winding means energized strongly by said fast wake-up network.

9. Apparatus for controlling fluid flow as set forth in claim 8 wherein said means producing said flow signals is a flowmeter, and wherein said means evaluating said flow signals and said setpoint signals includes a first electronic circuit which produces distinctively different outputs when said flow signals are lower and higher, respectively, than said threshold level, a second electronic circuit which produces distinctively different outputs when said setpoint signals are higher and lower, respectively, than said threshhold, and means turning on said electrical switching means only when said distinctively different outputs from said first and second electronic circuits characterize simultaneous occurrences of the lower flow signals and the higher setpoint signals.

10. Apparatus for controlling fluid flow as set forth in claim 9 wherein said first and second electronic circuits include amplifiers producing said different outputs in the form of high and low voltage outputs, respectively, and further including a diode coupling the voltage outputs from said circuits and wherein said electrical switching means comprises a field-effect transistor having its gate excited by the voltages appearing at one electrode of said diode and having its drain-source path connected to couple a reference voltage source with said controller means as said artificial electrical signal.

11. Apparatus for controlling fluid flow as set forth in claim 10 wherein said first electronic circuit produces high and low voltage outputs when said flow signals are lower and higher, respectively, wherein said second electronic circuit produces high and low voltage outputs when said setpoint signals are higher and lower, respectively, wherein the anode of said diode is connected to receive voltage outputs from said first electronic circuit and to excite said gate, and wherein said artificial electrical signal is of the order of about the full-scale value of said setpoint signals.

* * * * *